United States Patent
Marioni

(10) Patent No.: US 7,692,353 B2
(45) Date of Patent: Apr. 6, 2010

(54) PERMANENT-MAGNET TWO-PHASE SYNCHRONOUS ELECTRIC MOTOR WITH MECHANICAL START-UP FOR WASHING MACHINES AND SIMILAR HOUSEHOLD APPLIANCES, IN PARTICULAR FOR WASHING PUMPS

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 268 days.

(21) Appl. No.: 11/835,105

(22) Filed: Aug. 7, 2007

(65) Prior Publication Data
US 2008/0036310 A1 Feb. 14, 2008

(30) Foreign Application Priority Data
Aug. 11, 2006 (EP) .................................. 06016772

(51) Int. Cl.
 *H02K 1/14* (2006.01)
(52) U.S. Cl. .............................. 310/216.064; 310/166; 310/216.092
(58) Field of Classification Search ................. 310/162, 310/166, 167, 184, 185, 216–218, 254, 216.064, 310/216.092
See application file for complete search history.

(56) References Cited
U.S. PATENT DOCUMENTS

| 4,182,026 | A | * | 1/1980 | Searle ......................... 29/596 |
| 4,575,652 | A | * | 3/1986 | Gogue ....................... 310/49 R |
| 4,644,233 | A | * | 2/1987 | Suzuki .................. 318/400.09 |
| 5,708,406 | A | | 1/1998 | Tsunoda et al. |
| 5,909,072 | A | * | 6/1999 | Muller ...................... 310/68 B |
| 6,384,508 | B1 | | 5/2002 | Marioni |
| 6,452,303 | B1 | | 9/2002 | Marioni |
| 6,812,612 | B2 | * | 11/2004 | Schunk et al. .............. 310/218 |
| 2002/0149282 | A1 | | 10/2002 | Heidrich |
| 2004/0095035 | A1 | * | 5/2004 | Sogabe et al. ............... 310/216 |
| 2005/0162034 | A1 | | 7/2005 | Soghomonian |

FOREIGN PATENT DOCUMENTS

| DE | 23 37 905 A1 | 2/1975 |
| EP | 1 351 375 A1 | 10/2003 |
| GB | 621 005 A | 4/1949 |

* cited by examiner

Primary Examiner—Tran N Nguyen
(74) Attorney, Agent, or Firm—Akerman Senterfitt

(57) ABSTRACT

The invention relates to a permanent-magnet two-phase synchronous electric motor (1) with mechanical start-up for washing machines and similar, in particular for washing pumps (2), of the type centrally comprising a permanent magnet axial rotor (4) and a stator (5) with a lamination pack core (16) and a double pair of pole pieces (20) with ends enveloping said rotor (4) and with relative windings (L1, L2), wherein the first pair of pole pieces is asymmetrical compared to the second pair of pole pieces. Moreover, said motor is further distinguished for the structure of the stator, which comprises the following characteristics: the ends of the pole pieces (20) are structurally independent and are removably coupled to the lamination pack core; and the lamination pack core has a shorter axial length than the ends of the pole pieces (20). Advantageously, the pole pieces of the stator (5) are obtained by pressing of magnetic powders.

16 Claims, 11 Drawing Sheets

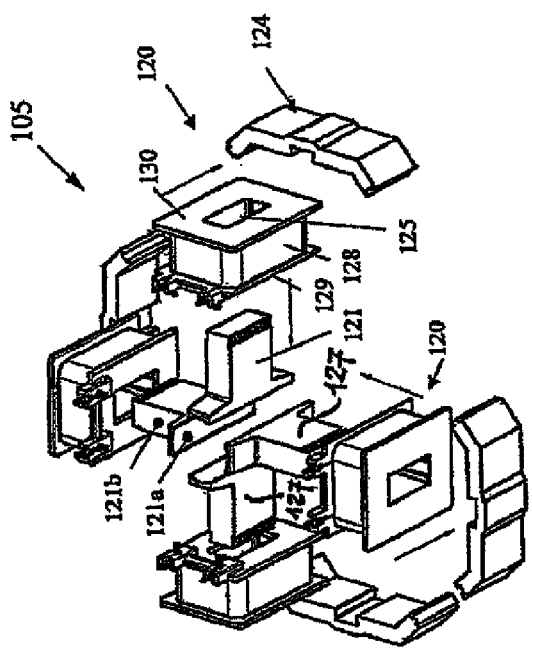
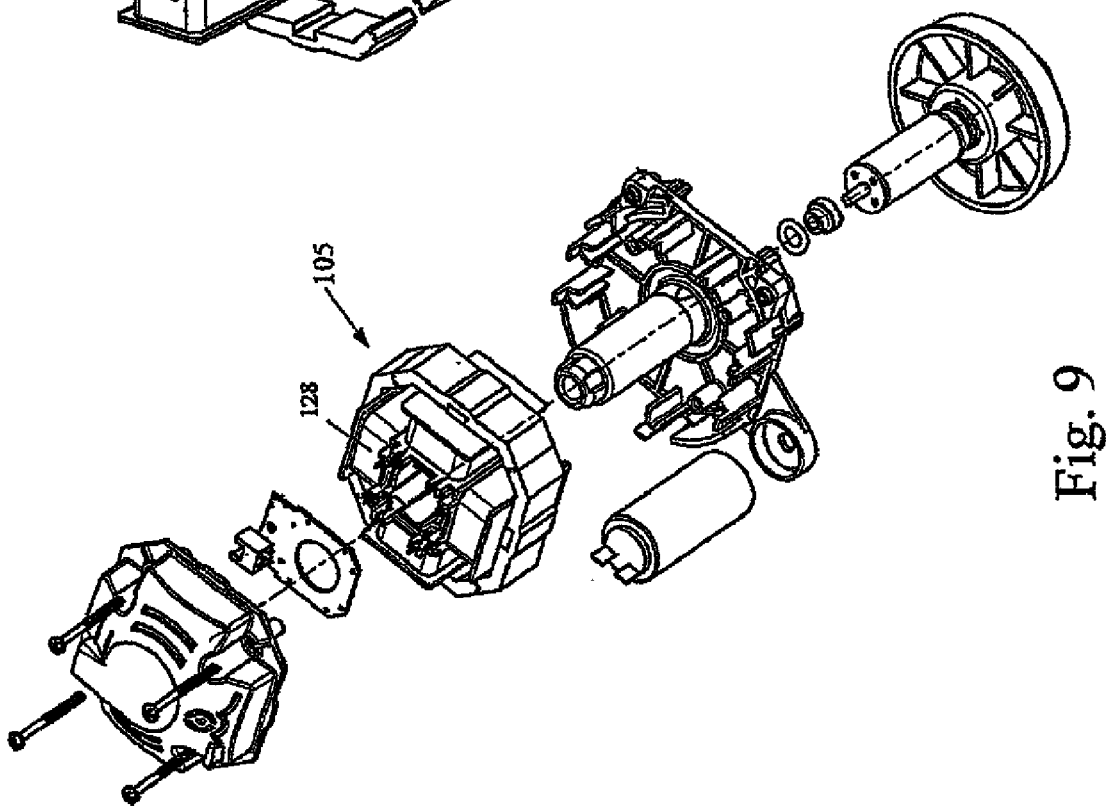
Fig. 10
Fig. 9

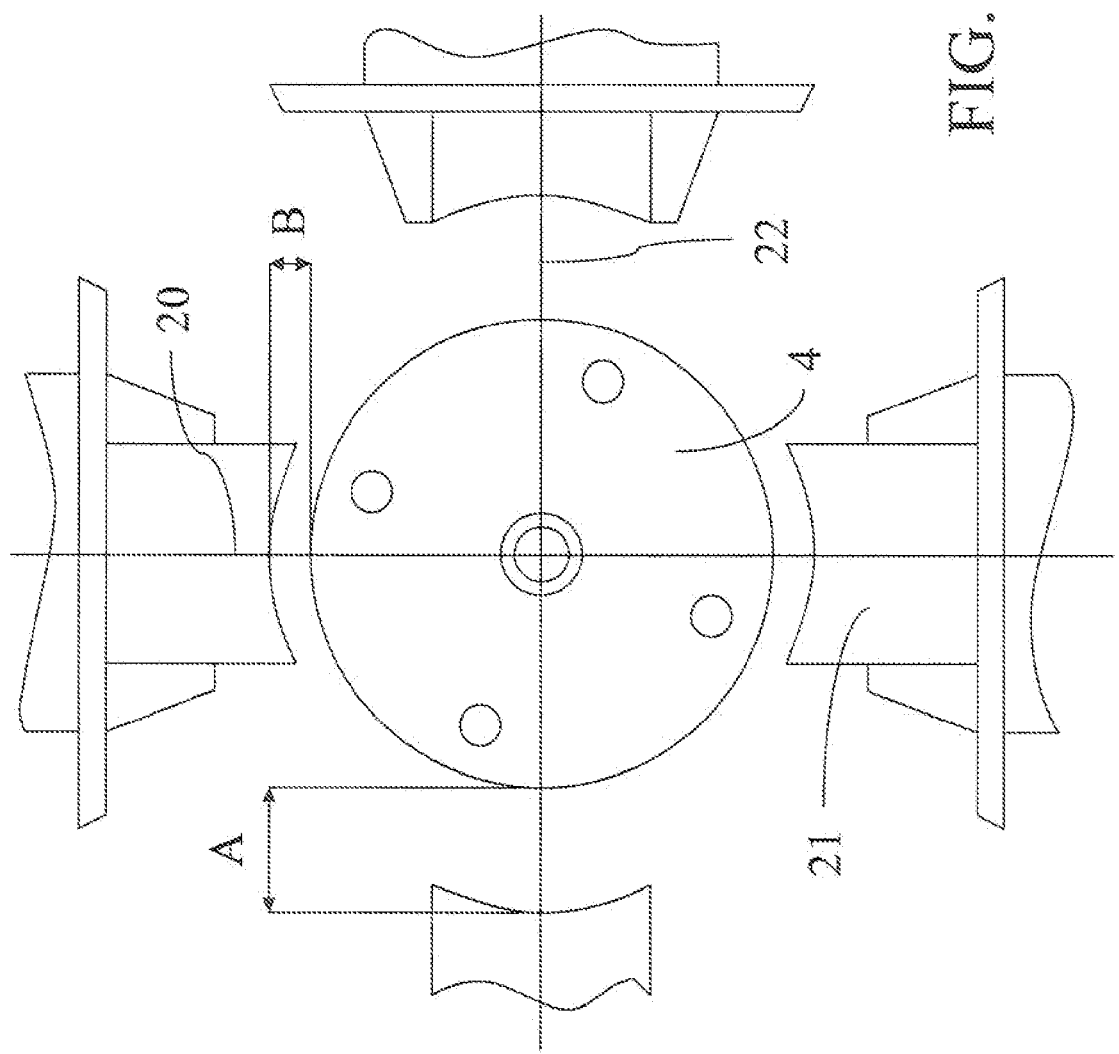

PERMANENT-MAGNET TWO-PHASE SYNCHRONOUS ELECTRIC MOTOR WITH MECHANICAL START-UP FOR WASHING MACHINES AND SIMILAR HOUSEHOLD APPLIANCES, IN PARTICULAR FOR WASHING PUMPS

FIELD OF APPLICATION

The present invention relates to a permanent-magnet two-phase synchronous electric motor with mechanical start-up, particularly but not exclusively indicated for dishwashing machines and similar household appliances, in particular for washing pumps of said machines.

More in particular, the invention relates to a motor of the above type and centrally comprising an axial rotor with permanent magnets, a stator with a lamination pack core and with a double pair of pole pieces, main and secondary, enveloping said rotor.

PRIOR ART

The need is known for producing washing pumps for household appliances such as washing machines, dishwashers, and similar appliances, which have the best hydraulic efficiency possible, meant as the best ratio between the hydraulics rate available at the pump, such as fluid pressure or power, and the electric power absorbed by the motor to which each pump is associated.

A further requirement for dishwashers is to lower the hydraulic power of the pump as much as possible and, consequently, the power supplied to the motor, so as to reduce both the quantity of fluid to be circulated and the power necessary to heat the water during the washing cycles.

In order to satisfy both these requirements, the prior art offers centrifugal or rotating pumps with high hydraulic efficiency for fluid circulation, for example as described in European patent no. EP 0983630B1 by the same Applicant.

Said pumps are set in rotation by a synchronous motor. However, as is known, there is an intrinsic problem with small synchronous motors due to the fact that, to set said pumps in rotation, bidirectional type motors are used where, during start up, the rotor can be rotated either clockwise or anticlockwise. Said bidirectional motors are advantageous since they are highly efficient and have a relatively low power absorption rate. This high hydraulic efficiency of the centrifugal pumps is obtained with flexible blade impellers which are pre-orientated and which allow to obtain unidirectional washing pumps characterized by a well-defined rotation direction.

Consequently, in order to produce rotating pumps with high hydraulic efficiency, driven by a synchronous motor, it is necessary to provide the motor with electronic starting devices (as described for example in patent EP1351375B1) or with mechanical starting devices (as described for example in the above-mentioned patent EP 0 983 630B1) which make it possible to establish the rotation direction of the synchronous motor in order to obtain the best possible hydraulic efficiency of the pump.

The electronic starting devices previously described are applied to single phase motors and have high costs regarding both production and application to the motor, said costs still representing an insuperable obstacle which prevails over the need to optimize power efficiency, so much so that the use of unidirectional motors with mechanical type devices are preferred even though they have lower efficiency and higher operational noise.

The high cost of said devices fundamentally prevents the use of centrifugal pumps on the above type on dishwashing machines for household use and belonging to the category of inexpensive machines.

As is well known to the skilled in the art, the washing pumps used in dishwashers today are driven by a single phase synchronous electric motor where the rotor is advantageously produced with permanent magnets and the stator comprises a lamination pack core with at least two pole pieces and consequent stator winding, provided with a mechanical type starting device.

The latter, which are the most common and economical synchronous motors, comprise only two stator pole pieces and make it possible to produce the so-called single phase synchronous pumps which, however, are penalized by the relatively high noise level due to vibrations.

Moreover, in an attempt to radically eliminate vibration problems due to the existing design of the single phase synchronous motor, the prior art proposes the use of a two-phase synchronous motor provided with four pole pieces for the washing pumps used in more expensive dishwashers. For example, a stator with four pole pieces for a synchronous motor is described in the U.S. Pat. No. 6,452,303 by the same Applicant.

Normally the four pole pieces are made with E-shaped sheared lamination packs. Said laminated sheets are obtained from the same sheet steel so as to reduce production waste and are overlapped in packs so forming stator group portions which are also E-shaped. Each stator pole piece is obtained by coupling a stator winding with a corresponding lamination pack.

This stator structure has the advantage that it is easy to make and at a relatively limited cost. However, the two-phase synchronous pumps produced until now with this stator structure also require an electronic driving device to make it possible, during the start transient phase, to start up the rotor of the synchronous motor gradually until operational synchronism is obtained.

However, the cost of the electronic driving device is comparable to the cost of the mechanical structure of the motor and, therefore, the use of two-phase synchronous motors becomes inconceivable for dishwashers in the inexpensive range but which, however, are those with the greatest sales volume.

The technical problem at the basis of the present invention is to provide a permanent-magnet two-phase synchronous electric motor, in particular for washing pumps for washing machines, which has structural and functional characteristics such as to allow an easy start-up of a completely mechanical type, further guaranteeing a simple structure and a limited number of components which make production possible at a considerably lower cost than the solutions offered today by the prior art.

SUMMARY OF THE INVENTION

The solution at the basis of the present invention is to provide, for the two-phase motor, a phase shift in the power supply at the stator windings and a stator structure such as to reduce the torque in the starting phase, so enabling better and more regular kinematic coupling between the rotor and the load.

The technical problem of the present invention is solved by a motor of the type previously indicated and defined in claim 1.

Moreover, in order to further reduce production costs, assembly of the stator group core is provided by means of a lamination pack with an axial length smaller than the axial length of the corresponding pole piece ends.

Advantageously, said pole piece ends are removably associated to the lamination pack and, in any case, are structurally independent.

It should also be noted that aforementioned pole piece ends are produced by pressing and successive sintering starting from microencapsulated magnetic powders and insulated by electrically insulating materials.

The features and advantages of the motor according to the invention will become more apparent from the following description of an embodiment given by way of indicative and non-limiting example with reference to the attached drawings.

BRIEF DESCRIPTION OF THE DRAWINGS

FIGS. 3 and 3A show top schematic views from above of a stator of the electric motor produced according to the invention and a detail of such stator respectively;

FIG. 9 shows a schematic view in perspective, with detached parts, of a portion of a pump with a stator variation;

FIG. 10 shows a schematic view in perspective of a detail of the stator variation shown in FIG. 9;

FIG. 14 is a partial top schematic view showing the rotor and pole ends of FIG. 3.

DETAILED DESCRIPTION

Figure 1:
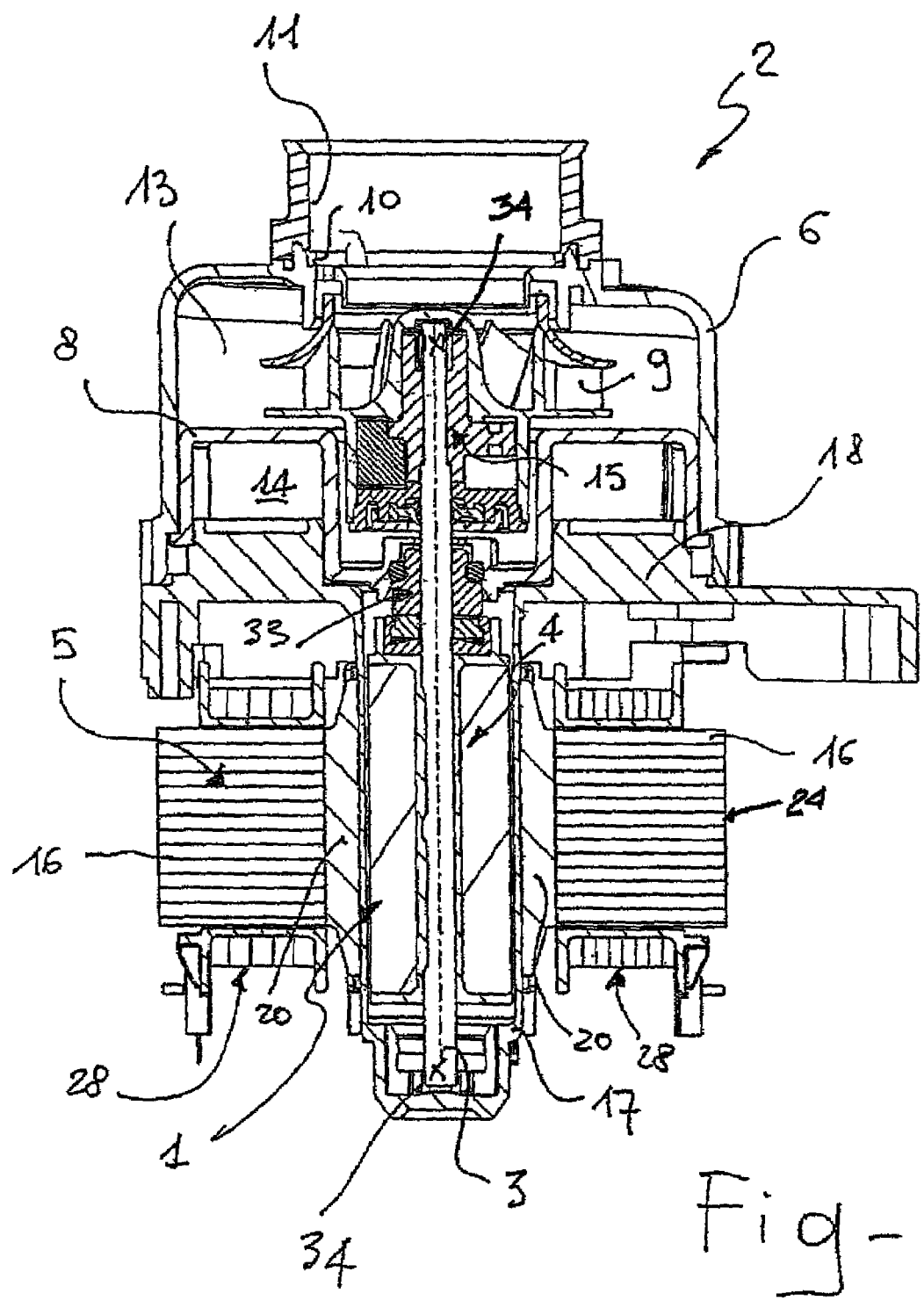
FIG. 1 schematically shows, in a longitudinal section, a washing pump incorporating a synchronous electric motor according to the present invention.

With reference to said drawings, 1 generally and schematically indicates a two-phase synchronous electric motor with mechanical starting made according to the present invention for driving a synchronous washing pump 2 to be mounted preferably on machines for washing such as washing machines and dishwashers, not shown in the drawings since they are conventional appliances.

The motor 1 has a permanent-magnet central rotor 4 and a stator 5 comprising a lamination pack core 16 with a double pair of pole pieces 20, main and secondary, enveloping the rotor 4 and from which they are distanced by respective air-gaps 22.

The rotor 4 has a longitudinal axis x-x which coincides with a rotation shaft 3, supported by opposing bearings 33, 34.

The rotor 4 is sealed from the stator 5 by a shell 17, essentially tube-shaped and forming integral part with a portion 181 of a flange intended to be coupled with a shell 6 of the pump 2. The slenderness ratio of the rotor, i.e. the length of the rotor compared to its diameter, is preferably greater than 2. The rotor 4 is a so-called low moment of inertia rotor, which makes it possible to obtain a shorter start transient, so that it rapidly reaches the synchronous speed.

As is known to the skilled in the art, the motor 1 is intended to drive the operational gear, i.e. an impeller 9, of the pump 2.

The protection shell 6 of the pump 2 is formed by a cup-shaped casing with a hole 10 defining an opening for an induction pipe 11. A delivery pipe 12 is radially connected to the cup-shaped casing.

Figure 2:
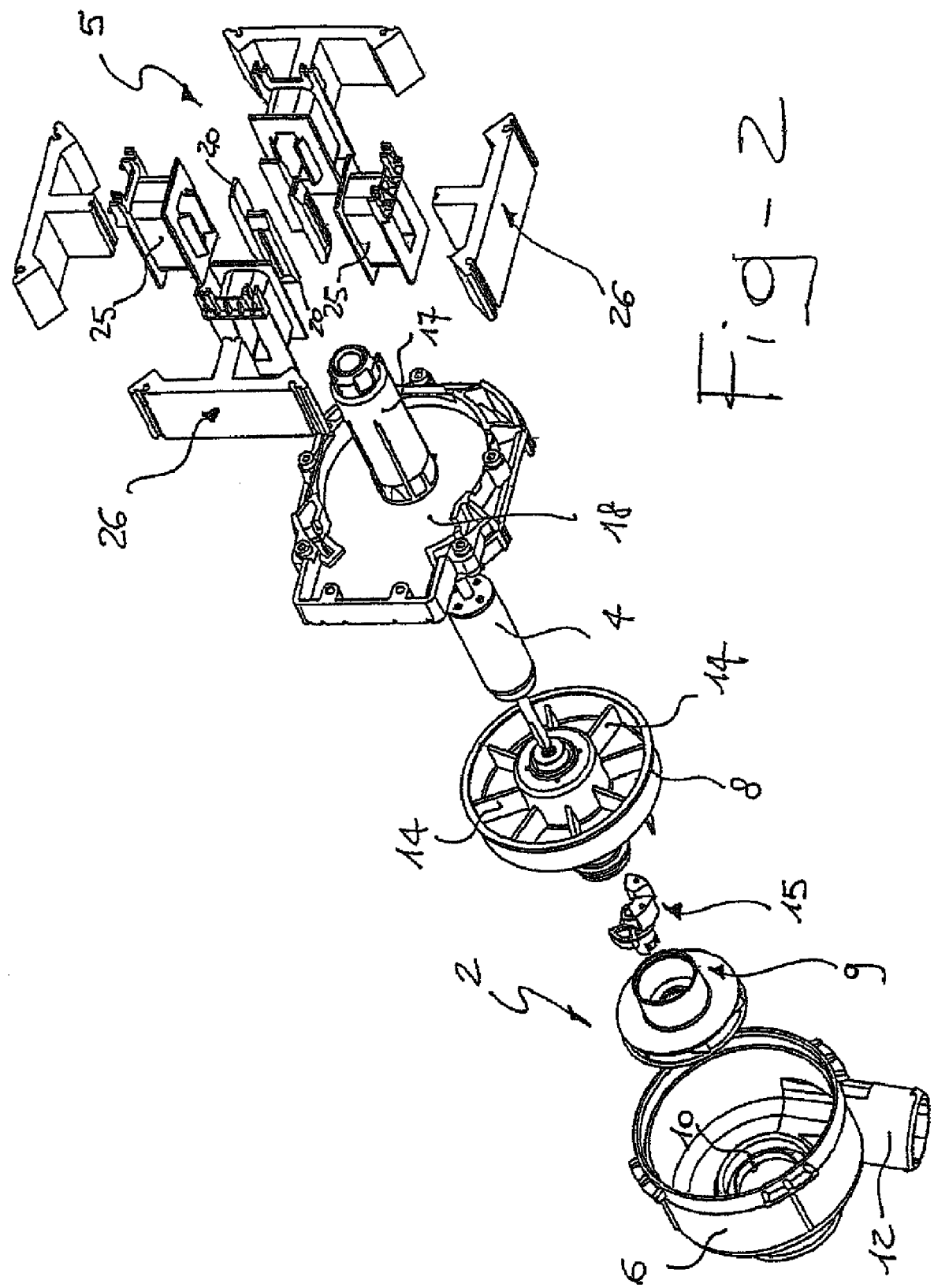
FIG. 2 shows schematically and in perspective, with detached parts, of the pump in FIG. 1 with all its components illustrated.

A chamber 13 is defined in the shell 6 for the impeller 9; said chamber 13 is sealed by a cover 8 visible in FIG. 2 and fitted on the mouth of the cup-shaped shell 6. The cover 8 is reinforced by ribbing 14.

The cover 8 is provided centrally with a hole for the passage of the end of the driving shaft 3 which is kinematically coupled to the impeller 9 preferably by means of a double coupling 15 described for example in European patent no. 0983630 by the same Applicant.

More in detail, the coupling between the driving shaft 3 and the impeller 9 is obtained by interposing two motion transmission couplings associated in kinematic series.

A first coupling comprises a driving tooth forming integral part with the end of the shaft 3 facing the impeller 9 and a second driven element, eccentric respect to the axis x-x and which revolves around the rotor inside a chamber lying under the impeller.

Said second driven element of the first motion transmission couplings represents the first driving element of the second motion transmission coupling which also comprises a second driven element integral with the impeller.

The angle covered by each motion transmission coupling is less than 360° but the overall angle covered by the pair of motion transmission couplings associated in kinematic series is greater than 360°.

In this way, the freedom of the rotor to rotate is greatly increased during start-up of the motor before effective load dragging takes place, in this case represented by the impeller 9 of the pump 2.

This characteristic makes it possible to gradually start up the two-phase motor according to the invention so as to reach synchronous operation in the best way possible.

Advantageously, the particularly slender rotor 4 of the present invention has no intrinsic difficulties during motor start-up. The double coupling 15 during start-up makes it possible to uncouple the load, i.e. the impeller 9 of the pump 2, allowing the rotor 4 to start in the right direction.

Figure 6:
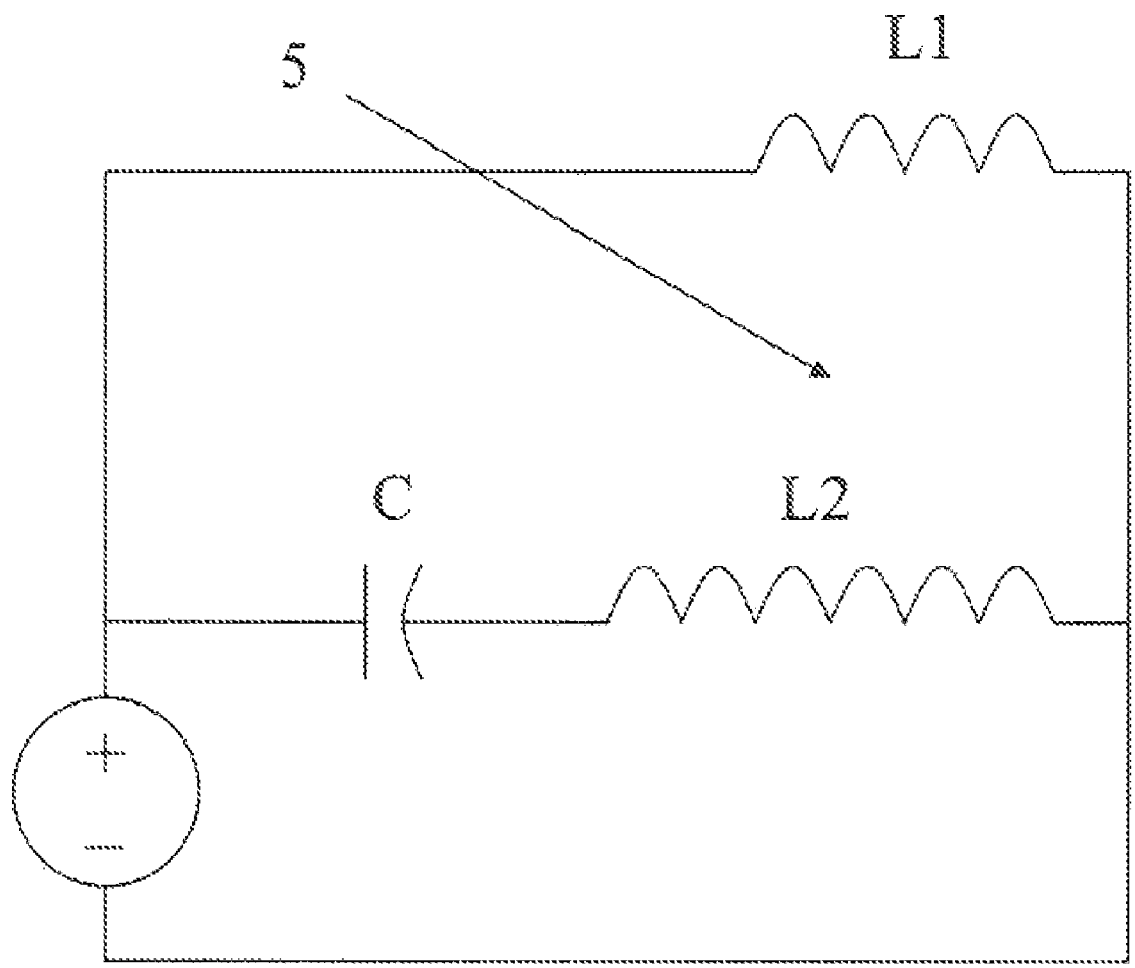
FIG. 6 schematically shows the power supply of the electric motor stator windings according to the invention.

According to the present invention, the device for coupling between the rotor and the load described above cooperates with the power supply of the motor which, as well illustrated in FIG. 6, make it possible to obtain a phase shift in the supply of the windings L1, L2 of the stator 5 by means of the use of a simple condenser C.

L1 and L2 are meant to represent the windings placed in the two-phase motor quadrature, each comprising two opposing coils connected in series and which are therefore considered as a single induction element called L1 or L2.

Therefore, while the main winding, indicated with L1, is supplied directly by the voltage Ea of the network power supply, the other secondary winding L2 is connected to the same power supply but with the interposing condenser C.

In this way, a phase shift of the voltage vector (0 current) is obtained which makes it possible to start the motor 1 generating a rotating magnetic field in the stator magnetic circuit.

It is well-known that two quadrature windings, supplied by sinusoidal currents out-of-phase with each-other by a time equal to 90 degrees, each generate a fixed magnetic field whose sum constitutes a rotating magnetic field. The more the shape of the fixed magnetic field of each winding comes close to a sinusoid in the space, the more the field resulting from their sum will contain only the sinusoidal component in the space, rotating at the synchronous speed. This means that an observer integral with the rotor at the synchronous speed can measure the value of a magnetic field, which results constant in time. With a winding having a high number of coils per phase, out of phase with each other spatially and/or with a different pitch, it is possible to approximate the shape of the fixed magnetic field to a sinusoid in the space and, therefore, to carry out that described above. The motors so produced are called distributed winding motors and can theoretically express a torque constant in time.

However, the motor according to the invention is a concentrated winding motor since each phase is made up of two equal opposing coils and, therefore, it does not produce a magnetic field with a sinusoidal shape in the space but rather a magnetic field with an approximately trapezoidal shape. The magnetic field resulting from the windings of the two phases will contain, besides the sinusoidal component in the space and rotating at the synchronous speed, the so-called harmonic wavelength fields and lower rotating speeds. The latter are responsible for torque oscillations, which in the motor according to the invention, are advantageously utilized to favor start-up. Unlike single phase motors where there is a field counter-rotating at the mains frequency with an amplitude equal to the synchronous field, in the motor according to the invention the counter-rotating field is considerably inferior to the synchronous one and the torque oscillations do not affect the silence.

In order to further optimize the structure of the motor according to the invention and, at the same time, reduce production and assembly costs, a expedient will be described which falls within the scope of the present invention. This expedient can be adopted in order to further improve the starting up phase and the overall performance of the motor, even if it is not strictly necessary to combine it with the features already described above.

As already said, the motor 1 comprises a stator 5, with relative core 24 with lamination pack 16 and stator windings 28.

The stator 5 conventionally comprises a plurality of metal laminations 16 arranged in a pack to form the core 24 and stator windings 28 arranged crossways to form at least four pole pieces.

More in particular, the four pole pieces are made with sheared lamination packs 16, substantially E-shaped. Such laminations 16 are obtained from the same sheet metal to reduce production waste and are overlapped in packs to form portions 26 of the stator group also E-shaped.

Each stator pole piece is obtained from coupling a stator winding 28 to a corresponding portion 26 of the lamination pack.

Figure 4:
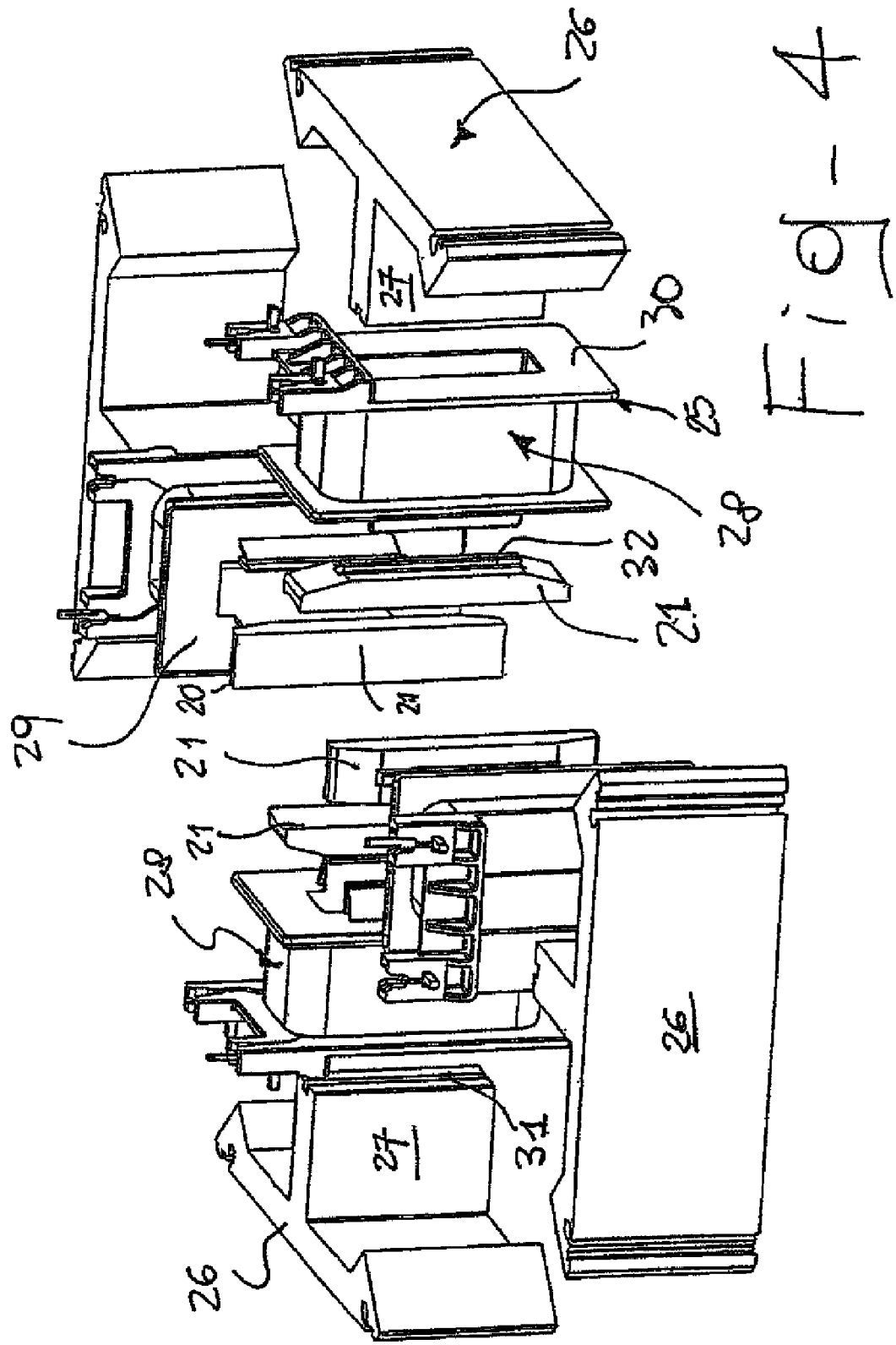
FIG. 4 shows schematically and in perspective, with detached parts, of the stator in FIG. 3.
Figure 5:
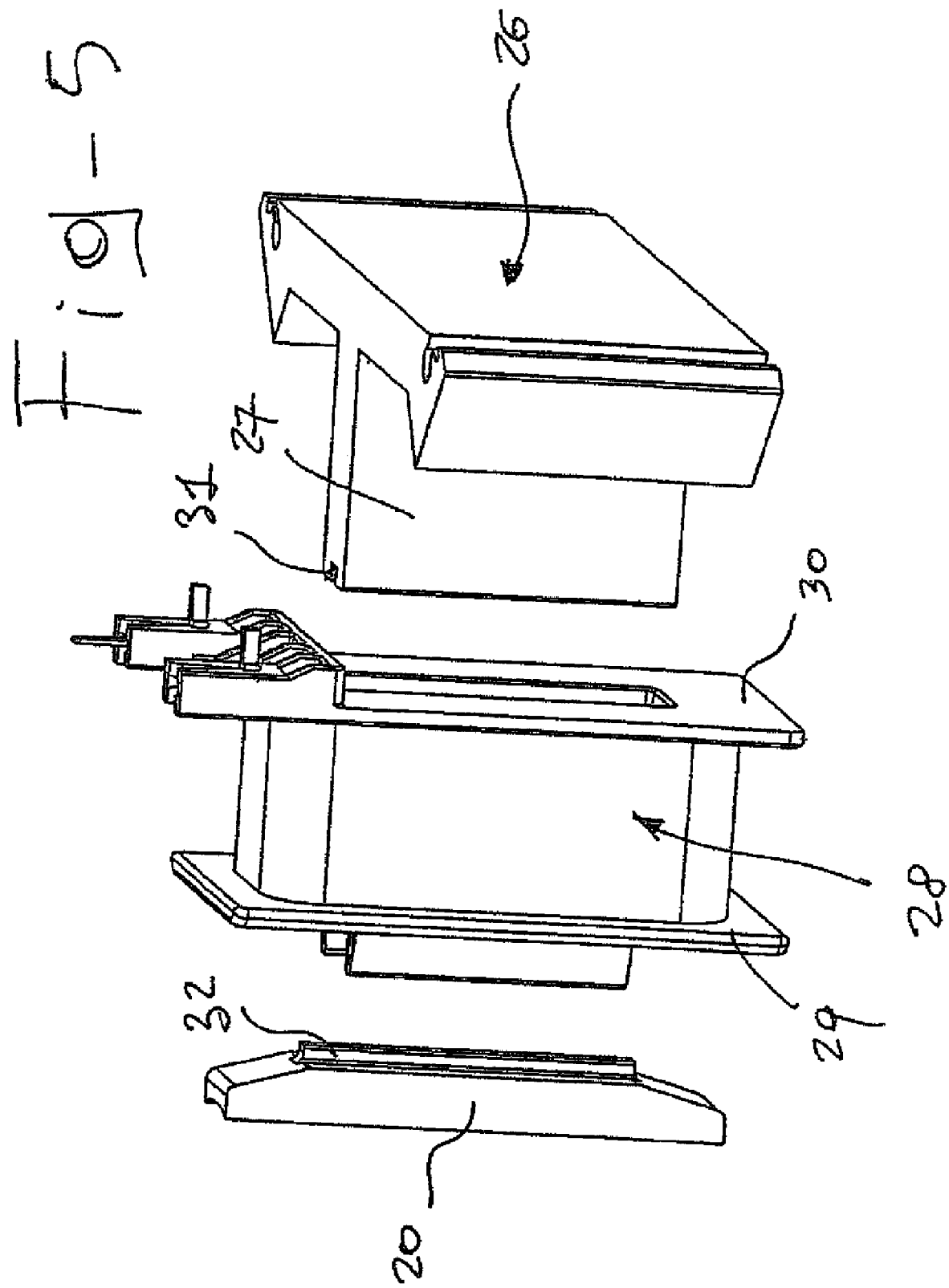
FIG. 5 shows a further schematic view in perspective of a detail of the stator in FIG. 3.

The stator windings 28 are made on coils 25 which are then put on to the central part 27 of the E-shaped lamination pack and the pole pieces so obtained are aligned to form a ring structure shown in FIG. 4 and normally made to cohere by means of springs which elastically bind the aligned ends of the E-shaped portions 26.

The coils 25 for supporting the stator windings 28 are preferably made in thermoplastic material with a hollow parallelepiped shape with opposing end flanges 29, 30.

Each coil 25 is intended to be put on with limited play and close to the central portion 27 of the E-shaped portion 26 of the lamination pack 16.

Advantageously, according to the invention, the assembly of the core 24 of the stator group is obtained by means of a lamination pack 16 with an axial length shorter than the axial length of the corresponding ends 21 of the pole pieces.

Even more advantageously, the ends 21 of the pole pieces 20 are removable associated to the core 24 with lamination pack 16 or, in any case, are structurally independent from them.

In other words, the ends 21 of the pole pieces are associated to each corresponding internal end of the central portion 27 of the E-shaped portion 26, of the core 24 with lamination pack 16.

This is made possible by the fact that said ends 21 of the pole pieces are made by pressing, starting from microencapsulated magnetic powders and insulated by electrically insulating material. The ends 21 produced in this way will be called hereinafter with the acronym SMC (Soft Magnetic Composite).

In substance, the dimensions of the core 24, where the stator windings 28 are to take place, are disengaged by the dimensions of the pole pieces 20, facing the permanent magnet of the rotor 4.

The above shorter axial length of the lamination pack core 24 is between 25% and 80% and preferably approximately 50% less than the ends of the pole pieces 20.

Surprisingly, this feature of the present invention does not worsen the efficiency of the synchronous motor, but above all it does not worsen performance at breakaway, i.e. at start-up, which is the most critical aspect of this type of motor, as will be described more in detail hereunder.

In substance, from experimental tests carried out by the Applicant, it emerged that, with the same breakaway voltage, start-up times and modes of the motor according to the present invention comply with the specifications of a synchronous motor having a conventionally structured stator, also with considerable cost saving in the stator structure.

Figure 3:
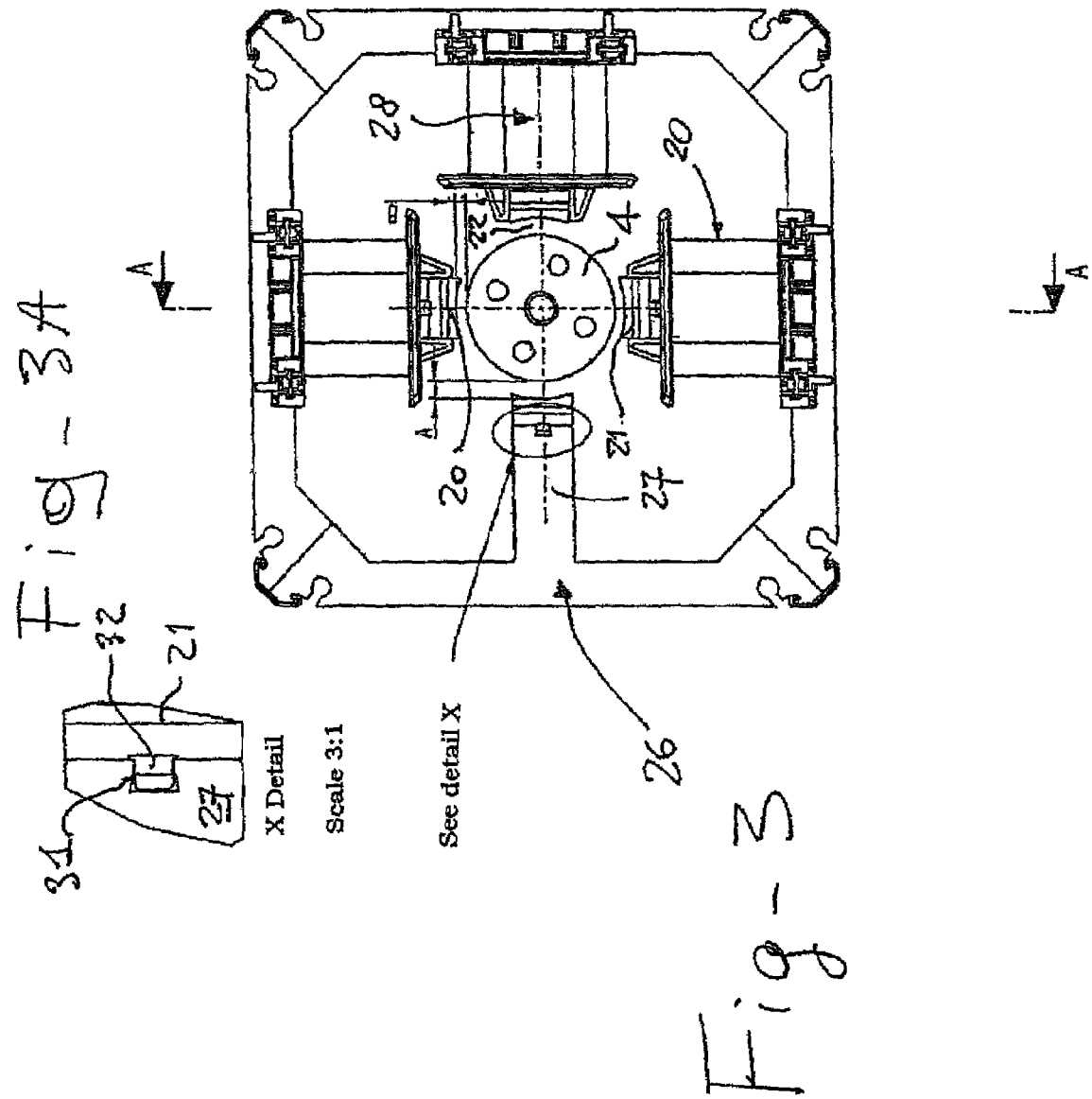

FIGS. 3 and 3A well illustrate the means of coupling between the ends 21 obtained by pressing of the stator pole pieces and the corresponding internal ends of the central portions 27 of the lamination pack core 24.

Coupling is obtained by a simple mortise and tenon joint 31, 32 made respectively and longitudinally in each end 21 and in each of the matching ends of the portions 27.

Obviously, the coupling means can be of a different form or dual on one or the other of said matching ends.

It should be noted that the synchronous motor 1 of the present invention can be provided with suitable electronic inverter circuits at the start-up phase.

Advantageously, providing a stator with pairs of pole pieces 20 with smaller dimensions, facilitates start-up of the motor using purely mechanical start-up of the rotor.

Suitably, for example an asymmetrical air-gap between at least one pair of opposing stator pole pieces 20 makes it possible to set up a motor with nearly mechanical start-up.

In other words, as well illustrated in the embodiment in FIG. 3, by adopting an expedient with the pair of opposing main pole pieces 20 of the stator distanced from the rotor 4 by an air-gap A greater than the air-gap B which separates the remaining opposing pair of secondary pole pieces, it is possible to obtain a reduction in the breakaway voltage, so making mechanical start-up of the motor advantageous. In this way, the magnetic induction between stator and rotor is sufficiently out-of-balance as to induce virtually mechanical start-up of the rotor.

Figure 7:
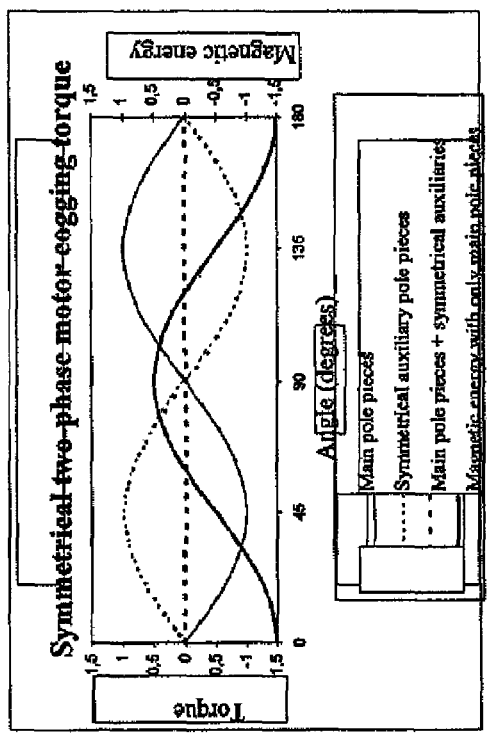

In an electric motor, a cogging torque is proportional to the opposite of the variation in energy of the magnetic field In the case of a rotor with an anisotropic magnet with so-called diametral (parallel) orientation and only one pair of opposing pole pieces, the magnetic energy and the cogging torque follow the trend indicated in the graph in FIG. 7.

In the case of a symmetrical two-phase motor, the cogging torque contributions of the pair of secondary pole pieces, having the same geometry but mechanically out-of-phase by 90 degrees compared to the pair of main pole pieces, follow a very similar trend but also out-of-phase by 90 degrees. The sum of the torque contributions of all the pole pieces is nullified and, therefore, the magnet does not have a preferred rest position of alignment.

Figure 8:
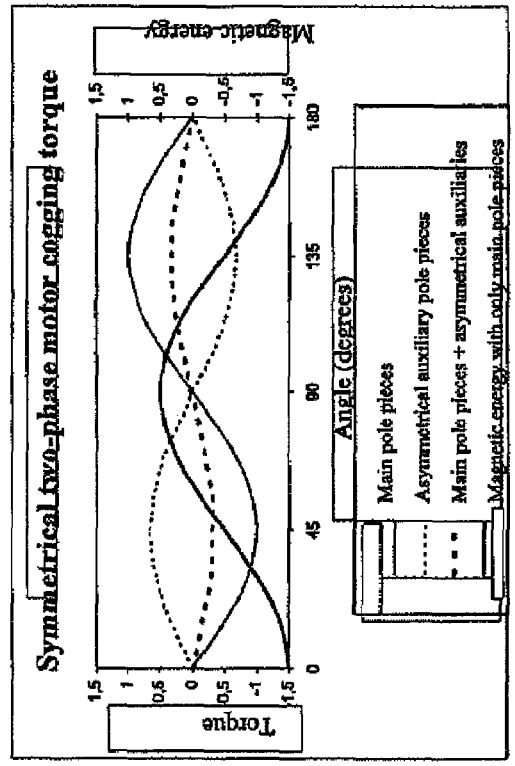
FIGS. 7 and 8 show a part of a diagram representing a variation in the cogging torque in a two-phase motor with stator with symmetrical and asymmetrical pieces respectively.

Advantageously, the use of main and secondary asymmetrical pole pieces appears to establish a contribution to the cogging torque of the motor which, as illustrated in FIG. 8, follows a sinusoidal trend with a zero net value only in alignment situations with the main pole pieces at 0 and 180 degrees and with the secondary pole pieces at 90 and 270 degrees.

Furthermore, it should be noted how the rest position at 90 degrees, unlike those at 0 and 180, is an unstable position for the rotor; in fact, an infinitesimal shifting of the rotor clockwise or anticlockwise gives rise to a torque which tends to increase said shifting taking the rotor to 0 or 180 degrees, positions in which the rotor stops.

In this way, the rotor has a preferred rest position of alignment with the poles facing the pair of main pole pieces.

In other words, pairs of pole pieces, main and secondary, asymmetrical with each other, make it possible to obtain a cogging torque, which is not constantly zero, determining a preferred rest position of alignment. This greatly benefits the motor during start-up and, in particular, considerably reduces the breakaway voltage.

A possible embodiment of the present invention provides to obtain main pole pieces with dimensions different from the secondary pole pieces, so obtaining asymmetry between these pairs.

Essentially the object of the invention is to reduce the breakaway voltage and to take advantage of the preferred rest position of alignment of the pole pieces by means of their geometrical asymmetry. However, this produces an undesired collateral effect, i.e. possible torque oscillation. This undesired effect can be put right by asymmetrical turns which reduce the torque oscillations introduced by the geometrical asymmetry.

The above-described asymmetry of the pairs of pole pieces has an effect on the respective currents I1 and I2, from the two branches L1 and L2 respectively, which have different amplitudes and are out-of-phase by a time by an angle different from 90 degrees. The inevitable torque non-uniformity, which results, is paid, in reality, through an increase in vibrations, in particular at a frequency of 100 Hz.

The drawback can be reduced by carrying out the winding L2 of the pair of secondary pole pieces with a different number of turns (for example, greater than the number of turns) from the winding L1 of the pair of main pole pieces and with a suitable choice of the capacitance value of the condenser placed in series at L2.

From experimental measurements, it was possible to establish a turn ratio between the pair of main coils and the pair of secondary coils suitable to considerably reduce the vibrations caused by the geometrical asymmetry, without penalizing the start-up voltage.

The residual torque ripple is very modest compared to the savings represented by the total lack of electronic circuitry used during motor start-up.

It should also be noted that a shorter axial length of the lamination pack core 24 results, consequently, a smaller cross section of the coils 25 supporting the windings 28. It ensues that it is possible to increase the number of turns using the same quantity of copper, due to the smaller perimeter of each turn.

Without going into elaborate theoretical concepts, it is worth noting that, with the motor according to the present invention, a greater specific power can be obtained with the same amount of losses. The supply voltage is linked to the breakaway voltage according to a ratio well defined in design specifications and normally greater than 1.1. The voltage applied at the input terminals is generally distributed in a fall $\Delta Vr$ on the resistance of the coil Ra, a fall $\Delta Vd$ on the dispersion inductance Ld, i.e. tied to all the magnetic flux which does not link the rotor 4, and an electromotive force $E_0$ on the induced reaction inductance L1 relative to the magnetic flux which links the magnet and produces torque.

Hence the vector relation:

$$Ea = \Delta Vr + \Delta Vd + E_0$$

The maximum number of turns must be suitably low so as to guarantee the breakaway voltage desired. But since the losses depend on the ratio Ea/N, it ensues that the losses and the heating at nominal voltage will be considerably higher than what would be suitably feasible if the supply voltage was not linked to the breakaway voltage and the motor was optimized for maximum electrical efficiency.

It results from the previous relation that the components $\Delta Vr$ and $\Delta Vd$ reduce the voltage effectively available to create torque, both during the start transient phase and in conditions of synchronism. The motor according to the invention has substantially managed to minimize the effect of the voltage drops by reducing the respective parameters Ra and Ld. The result is the possibility to increase the number of turns while keeping constant the breakaway voltage value.

As is known, the current of a synchronous motor with isotope rotor is given by:

$$I = \frac{\sqrt{E_a^2 + E_o^2 - 2 \cdot E_a \cdot E_o \cdot \cos(\delta)}}{Z}$$

$E_0$ is the voltage induced only by the flux of the magnet on the winding of a phase and can be expressed by the product: $E_0 = N \cdot (2\pi \cdot f) \cdot \phi = N \cdot \omega \cdot \phi$, with $\phi$ effective flux induced by the magnet in winding, depending exclusively on the material and the geometry of the motor.

$\delta$ is the so-called "angle of load" obtained from:

$$P_{mecc} = 2 \cdot \left( E_a \cdot \frac{E_o}{Z} \cdot \sin\left(\delta + \operatorname{atan}\left(\frac{R_a}{\omega \cdot L_s}\right)\right) - \frac{E_o^2 \cdot R_a}{Z^2} \right)$$

Z is the impedance of the motor $Z^2 = Ra^2 + (2\pi \cdot f \cdot Ls)^2$, with f the supply frequency and Ls the stator synchronous inductance. The latter differs from Ld since it also comprises the reaction inductance Li, due to the part of the stator flux which invests the magnet, producing the driving torque, so that Ls=Ld+Li.

Since the flux linkage N·φ is proportional to Li, it would be appropriate to be able to maximize such value. However, Li depends on the geometry of the air-gap, in other words on the part of the motor which faces the magnet, which is subjected to constraints different from those of the other parts of the motor, which mainly influence Ld. Therefore, hereinafter we will refer to Ld.

As is known to the skilled in the art, both the resistance Ra and the inductance Li of the winding can be expressed as the product $$Ra = N^2 \cdot r_{a1} \text{ and}$$

$$Ls = N^2 \cdot l_{s1} = N^2 \cdot (l_{d1} + l_{i1})$$

where $r_{a1}$ and $l_{d1}$ would coincide with the resistance Ra and the leakage inductance Ld of the winding if this had only one turn, and will be called "unitary resistance" and "unitary leakage permeance". As far as the resistance is concerned, this is valid for the same length of the average turn and total cross section of the conductor. Given that both parameters depend on $N^2$, this concept extends to the impedance $Z = N^2 \cdot z_1$ ("unitary impedance"). The parameters $r_{a1}$ and $l_{d1}$ and $z_1$ depend exclusively on the constituent material, on the geometry of the motor and on the factor of crowdness of the conducting material. Substituting the expressions of $Z = N^2 \cdot z1$ and $E_0 = N \cdot \omega \cdot \phi$ in the expressions of I and Pmecc, we have:

$$I = \frac{\sqrt{\left(\frac{E_a}{N}\right)^2 + (\omega \cdot \phi)^2 - 2 \cdot \left(\frac{E_a}{N}\right) \cdot \omega \cdot \phi \cdot \cos(\delta)}}{N \cdot z_1}$$

$$P_{mecc} = 2 \cdot \left[\left(\frac{E_a}{N}\right) \cdot \left(\frac{\omega \cdot \phi}{z_1}\right) \cdot \sin\left(\delta + \operatorname{atan}\left(\frac{r_{a1}}{\omega \cdot l_{s1}}\right)\right) - r_{a1} \cdot \left(\frac{\omega \cdot \phi}{z_1}\right)^2\right]$$

and, finally, the Joule effect $$p_j = 2N^2 \cdot r_{a1} \cdot I^2 = 2 \cdot \frac{r_{a1}}{z_1^2} \cdot \left[\left(\frac{E_a}{N}\right)^2 + (\omega \cdot \phi)^2 - 2 \cdot \left(\frac{E_a}{N}\right) \cdot \omega \cdot \phi \cdot \cos(\delta)\right]$$

More in particular, in a synchronous motor with the same supply frequency, delivered torque and stator and coil geometry, the current and the losses depend on the ratio Ea/N (supply voltage per turn).

The above can be extended by induction to the breakaway voltage, which is exactly proportional to the number of turns, as confirmed also during experiments.

Acting only on the geometry of the motor and the coils, the unitary resistance and the leakage permeance can be reduced, but this also implies an increase in the absorbed current.

As the unitary resistance decreases, so do the losses in the windings. However, it is possible, with the same volume and cost of conducting material, to keep them constant, reducing the number of turns, as can be seen in FIG. 8A, where 1 corresponds to the unitary resistance and the turns of the traditional motor. As said above, reducing the turns is equivalent to applying a higher voltage, to the benefit of the breakaway voltage.

Figure 8B:
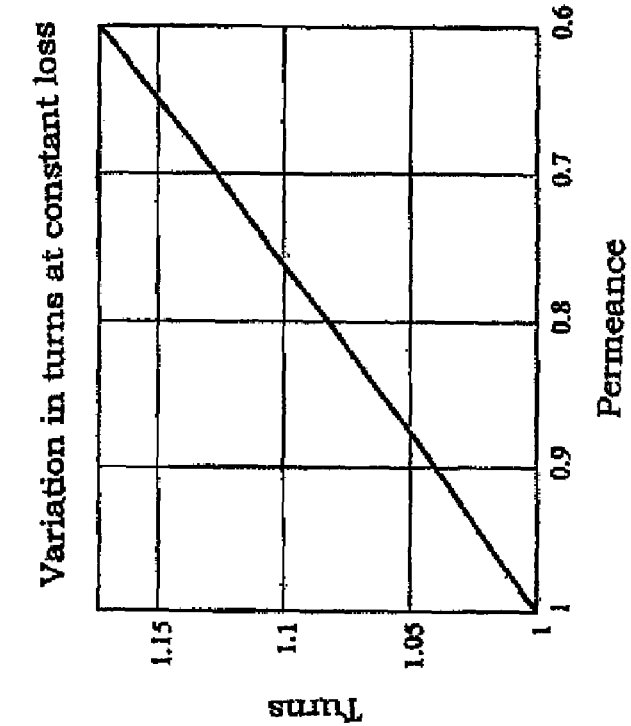
FIGS. 8A and 8B show, in respective diagrams, the values of unitary resistance and permeance of the motor windings in relation to the number of turns varies.
Figure 8A:
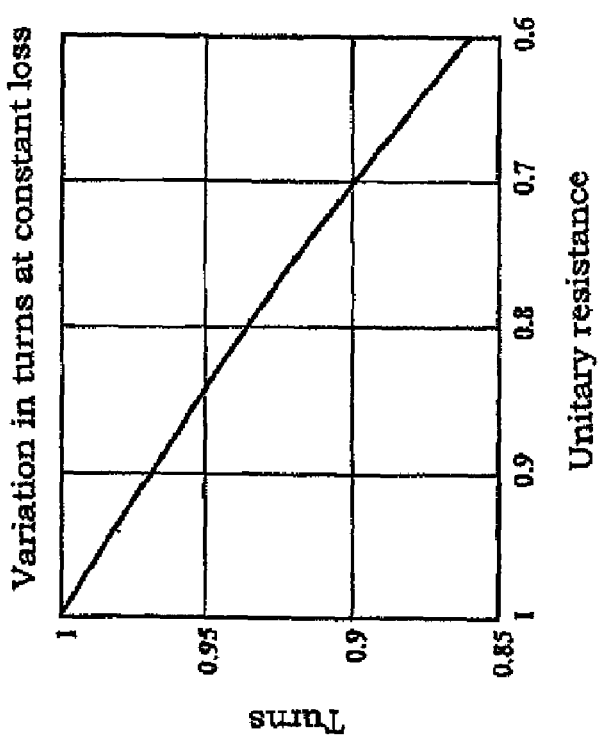

As the leakage permeance is reduced, the number of turns necessary to maintain the losses constant in the windings must be increased, as can be seen in FIG. 8B, where 1 corresponds to the synchronous permeance and the turns of a traditional motor.

However, this is not a disadvantage because increasing the turns makes it possible to increase the flux linkage N·φ between stator windings and magnets, by virtue of the proportionality between N·φ and $Li = N^2 \cdot 1_{i1}$, having presumed constant $1_{i1}$. So, in this case too, the breakaway voltage is reduced.

In the motor according to the invention, the turns are even greater than those indicated in FIGS. 8A and 8B, with the intention of keeping the breakaway voltage constant at the value also established for the traditional motor.

Also due to the ratio Ea/N, the resulting greater number of turns on the windings 28 and the simultaneous reduction in cross section, lead to a lower voltage per turn and, therefore, fewer running losses.

The motor according to the invention has the great advantage that it is particularly silent, since it is structured as a two-phase motor with a particularly regular operation.

Such motor also has the great advantage of having exclusively mechanical start-up, obtained with the simple combination of a phase shift in the power supply and kinematic coupling with double coupling between rotor and load.

Moreover, the motor according to the invention has the important advantage of an unusually simple structure at a production cost much lower than that of existing alternative solutions belonging to the prior art.

Another advantage is given by the fact that the dimensions and shape of the stator pole pieces are disengaged by the dimensions of the lamination pack core to which they are associated.

Finally, the limited number of connections should be noted since this makes assembly easier and more reliable and improves overall efficiency.

A stator variation, according to the present invention, is schematically illustrated in FIGS. 9 and 10. The stator 105 has four pole pieces 120, each comprising a core 124 and corresponding stator windings 128 conventionally arranged crossways.

The cores 124 are made with sheared laminated lamination overlapping in packs.

The stator windings 128 are made on coils 125 put on a central part 127 of the respective core 124. The so-obtained pole pieces 120 are aligned so as to form a ring-like structure shown in FIG. 10.

The coils 125 for supporting the stator windings 128 are preferably made in thermoplastic material with a hollow parallelepiped shape with opposing end flanges 129, 130.

Each coil 125 is intended to be put on with limited play and close to the central portion 127 of each lamination pack.

Advantageously, according to the invention, the assembly of the core 124 of the stator group is obtained by means of a lamination pack with an axial length shorter than the axial length of the corresponding ends 121 of the pole pieces 120.

Advantageously, as shown in FIG. 10, the ends 121 are substantially T-shaped with a head 121*a* associated to a stem 121*b*.

The head 121*a*, facing a central rotor, has an length which is placed substantially axially to the central rotor, while the stem 121*b* projects radially. In particular, the stems 121*b* of each end 121 centrally put on, with limited play, on to each respective coil 125 and are associated centrally to the lamination pack core 124, so that they can be removed or, in any case, are structurally independent from them.

This is made possible by the fact that the ends 121 of the pole pieces 120 are made by pressing, starting from microencapsulated magnetic powders and insulated by electrically insulating material.

This embodiment has many advantages; in fact, since the pole pieces are made in separate parts and in particular it allows that the stator can be mounted much more quickly.

Figure 13:
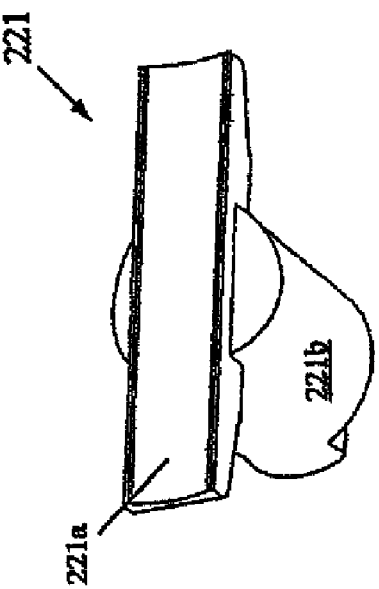
Figure 11:
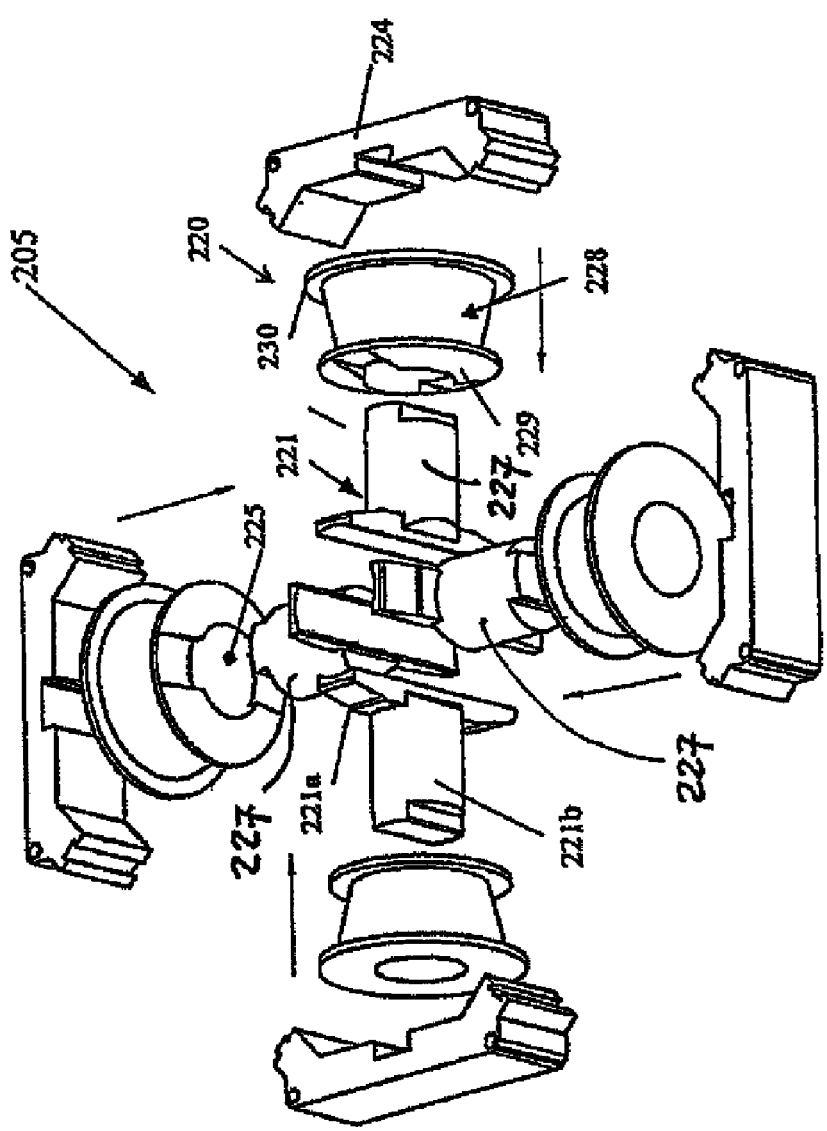
FIG. 11 shows a schematic view in perspective of a detail of a second stator variation.

A further variation of the stator is illustrated in FIG. 13.

In this embodiment, substantially similar to the one illustrated in FIG. 10, the stator 205 has four pole pieces 220 with stator windings 228 on coils 225 put on a central part 227 of a respective core 224.

Advantageously, according to the invention, the core 224 of the stator group is assembled by means of a lamination pack with an axial length shorter than the axial length of the corresponding ends of the pole pieces 220.

More advantageously, the coils 225, in this embodiment, have the shape of a hollow truncated cone, which widens towards the outside, with opposing end flanges 229, 230.

Each coil 225 is intended to be put on with limited play and close to the central portion 227 of each lamination pack.

Figure 12:
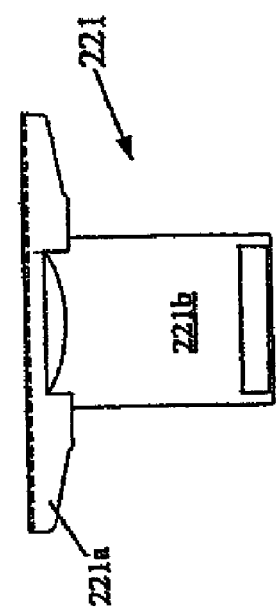
FIGS. 12 and 13 respectively show a view in perspective and a lateral view of a variation according to an embodiment of stator pole piece end.

Advantageously, the ends 221 are substantially T-shaped with a head 221a connected to a stem 221b, as illustrated in FIGS. 12 and 13.

The head 221a, facing the rotor, has a length which is placed substantially axially to the rotor, while the stem 221b has a substantially radial projection. The stem 221b defines the central part 227 of each lamination pack core 224.

The head 221a has a central groove along its axial length with a substantially "dovetail" or "mortise and tenon" shape.

Advantageously, said ends 121 of the pole pieces and, in particular, the respective stems 121b are associated to the lamination pack core 124 so that they can be removed or, in any case, are structurally independent from them.

This is made possible by the fact that the ends 221 of the pole pieces 220 are made by pressing, starting from microencapsulated magnetic powders and insulated by electrically insulating material.

Advantageously, this embodiment of the stator makes it possible to obtain a uniform and homogeneous magnetic field.

The main advantage of the present invention is the easy mechanical start-up of the motor; in fact, having the rotor in a preferred rest position with the pair of main pole pieces requires lower breakaway voltage during start-up.

A further advantage of the present invention is connected to the simplicity of producing the synchronous electric motor with mechanical start-up obtained by means of an unusual asymmetry of the pairs of pole pieces.

Another considerable advantage is connected to the rapidity with which the pole pieces can be mounted on the two-phase synchronous motor according to the present invention.

A further advantage of the motor according to the present invention is that, thanks to a cogging torque, which is not constantly zero, it is possible to avoid the use of electronic start-up devices.

The last but not least advantage of the motor according to the present invention is its reduced noise during operation.

The invention claimed is:

1. A permanent-magnet two-phase synchronous electric motor for washing machines comprising:
   a mechanical start-up;
   a permanent magnet axial rotor; and
   a stator with a lamination pack core and windings,
   wherein said stator has a double pair of pole pieces comprising a pair of main pole pieces and a pair of secondary pole pieces, said double pair of pole pieces enveloping said rotors, and
   wherein said pair of main pole pieces is asymmetrical in respect to said pair of secondary pole pieces.

2. The permanent-magnet two-phase synchronous electric motor according to claim 1, wherein said pair of main pole pieces has different dimensional characteristics from said pair of secondary pole pieces concerning said asymmetry.

3. The permanent-magnet two-phase synchronous electric motor according to claim 1, wherein said winding of said pair of main pole pieces has a different number of turns from said winding of said pair of secondary pole pieces.

4. The permanent-magnet two-phase synchronous electric motor according to claim 1, further comprising a coupling between said rotor and a load formed of at least one motion transmission coupling comprising a driving element and a driven element associated in kinematic series, and wherein a power supply to the windings of one of the pairs of pole pieces is obtained by interposing a condenser.

5. The permanent-magnet two-phase synchronous electric motor according to claim 4, wherein said coupling comprises a first joint formed by one driving element and one driven element, and a second joint comprising one driving element and one driven element, and wherein the driven element of the first joint is the driving element of the second joint.

6. The permanent-magnet two-phase synchronous electric motor according to claim 5, wherein each joint comprises a first driving element eccentric with respect to an axis of the rotor and a second driven element eccentric with respect to said axis.

7. The permanent-magnet two-phase synchronous electric motor according to claim 1, wherein said pair of main pole pieces are distanced from the rotor by an air-gap which is larger than an air-gap that separates said pair of secondary pole pieces from the rotor.

8. permanent-magnet two-phase synchronous electric motor according to claim 1, wherein said pair of main pole pieces have an axial length at ends thereof that is greater than an axial length of ends of said pair of secondary pole pieces.

9. The permanent-magnet two-phase synchronous electric motor according to claim 1, wherein ends of said pair of main pole pieces are structurally independent and are removably coupled to the lamination pack core.

10. The permanent-magnet two-phase synchronous electric motor according to claim 1, wherein ends of said pole pieces of the stator are obtained by pressing of magnetic powders.

11. The permanent-magnet two-phase synchronous electric motor according to claim 10, wherein said magnetic powders are microencapsulated and insulated by electrically insulating material.

12. The permanent-magnet two-phase synchronous electric motor according to claim 1, wherein the lamination pack core is obtained by annularly linking an E-shaped group of overlapping laminated sheet portions to the central portion of the E extending towards the rotor, and wherein coils supporting the stator windings are put on to said central portions close to the lamination pack.

13. The permanent-magnet two-phase synchronous electric motor according to claim 1, wherein a connection between ends of said pole pieces of the stator and each corresponding portion of the lamination pack core is obtained by means of a mortise and tenon joint.

14. The permanent-magnet two-phase synchronous electric motor according to claim 1, wherein an axial length of said stator lamination pack core is in the range of 25% to 80% compared to an axial length of corresponding ends of the pole pieces.

15. The permanent-magnet two-phase synchronous electric motor according to claim 14 wherein said axial length of said stator lamination pack core is equal to approximately 50% of the axial length of the corresponding ends of the pole pieces.

16. The permanent-magnet two-phase synchronous electric motor according to claim 1, wherein a ratio of an axial length of the permanent magnet axial rotor to a diameter thereof is greater than 2.

* * * * *